United States Patent
Charych

(10) Patent No.: US 8,300,441 B2
(45) Date of Patent: Oct. 30, 2012

(54) ACTIVE CENTERPOINT POWER BUS BALANCING SYSTEM

(75) Inventor: Arthur Charych, Setauket, NY (US)

(73) Assignee: BC Systems, Inc, Setauket, NY (US)

( * ) Notice: Subject to any disclaimer, the term of this patent is extended or adjusted under 35 U.S.C. 154(b) by 309 days.

(21) Appl. No.: 12/773,379

(22) Filed: May 4, 2010

(65) Prior Publication Data

US 2010/0277954 A1  Nov. 4, 2010

Related U.S. Application Data

(60) Provisional application No. 61/175,110, filed on May 4, 2009.

(51) Int. Cl.
  *H02M 7/44* (2006.01)
  *G05F 1/46* (2006.01)
(52) U.S. Cl. ......................................... 363/98; 323/288
(58) Field of Classification Search .......... 363/282–285, 363/288, 241–247, 207–211; 323/34, 50, 323/52, 39, 41, 44–46, 78–82, 84, 86
See application file for complete search history.

(56) References Cited

U.S. PATENT DOCUMENTS

| | | | |
|---|---|---|---|
| 4,347,558 A * | 8/1982 | Kalinsky | 363/17 |
| 6,781,423 B1 | 8/2004 | Knoedgen | |
| 6,914,794 B2 * | 7/2005 | Watanabe et al. | 363/132 |
| 7,495,938 B2 | 2/2009 | Wu et al. | |
| 7,596,004 B2 * | 9/2009 | Grbovic | 363/21.12 |
| 2003/0128563 A1* | 7/2003 | Rojas Romero | 363/89 |
| 2008/0013352 A1 | 1/2008 | Baker | |
| 2009/0322298 A1* | 12/2009 | Nishida | 323/282 |

FOREIGN PATENT DOCUMENTS

DE  3705866 A1  9/1988

* cited by examiner

*Primary Examiner* — Jue Zhang
*Assistant Examiner* — Henry Lee, III
(74) *Attorney, Agent, or Firm* — Brown & Michaels, PC

(57) ABSTRACT

An active centerpoint bus balancing system which actively maintains centerpoint voltage balance of the output capacitors in a power supply having a multi-level voltage output. The centerpoint voltage balance is maintained by a novel control circuit which efficiently transfers charge from one capacitor to the other capacitor so as to maintain the same voltage on each output capacitor. The centerpoint voltage balance minimizes the effect of loading conditions. It operates even with no load, and allows severe load unbalance on the two output capacitors without creating voltage unbalance.

14 Claims, 4 Drawing Sheets

ACTIVE CENTERPOINT POWER BUS BALANCING SYSTEM

REFERENCE TO RELATED APPLICATIONS

This application claims one or more inventions which were disclosed in Provisional Application No. 61/175,110, filed May 4, 2009, entitled "ACTIVE CENTERPOINT POWER BUS BALANCING SYSTEM". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of active rectifiers. More particularly, the invention pertains to an active rectifier with an active centerpoint power bus balancing system.

2. Description of Related Art

Many types of three phase AC to DC active rectifiers are in use today. These systems convert three phase AC inputs to a DC output, while controlling the input current waveforms so as to maintain a high power factor, which reduces the cost of electrical power.

Some of the most efficient (most cost effective) active rectifiers utilize a three voltage level output. The output is split between two series connected capacitors. This capacitor centerpoint is needed as a return for power semiconductors, and its voltage must be kept centered between the two capacitors in order for efficient system operation, as well as to maintain low voltage stress on the power semiconductors.

A number of control schemes exist for maintaining centerpoint balance, but all have their limitations. Most will not work well under lightly loaded conditions, and will not maintain voltage balance when one capacitor load is much higher than the other capacitor load.

Every active rectifier system contains a housekeeping power supply, which is used to operate its control and power circuits.

SUMMARY OF THE INVENTION

An active centerpoint bus balancing system is provided which actively maintains centerpoint voltage balance of the output capacitors in a power supply having a multi-level voltage output.

The centerpoint voltage balance is maintained by a novel control circuit which efficiently transfers charge from one capacitor to the other capacitor so as to maintain the same voltage on each output capacitor.

The centerpoint voltage balance minimizes the effect of loading conditions. It operates even with no load, and allows severe load unbalance on the two output capacitors without creating voltage unbalance.

DETAILED DESCRIPTION OF THE INVENTION

The disclosed invention modifies the housekeeping power supply in an active rectifier system, so that in addition to operating the Rectifier System control and power circuits, it also actively maintains centerpoint voltage balance of the output capacitors.

The housekeeping supply described in this invention can also be used as a standalone DC to DC converter which will transfer charge between two capacitive sources, not necessarily in series, so as to maintain any voltage ratio between the two capacitors. Power will be transferred dynamically from one source to the other, maintaining proper voltage balance.

Figure 1:
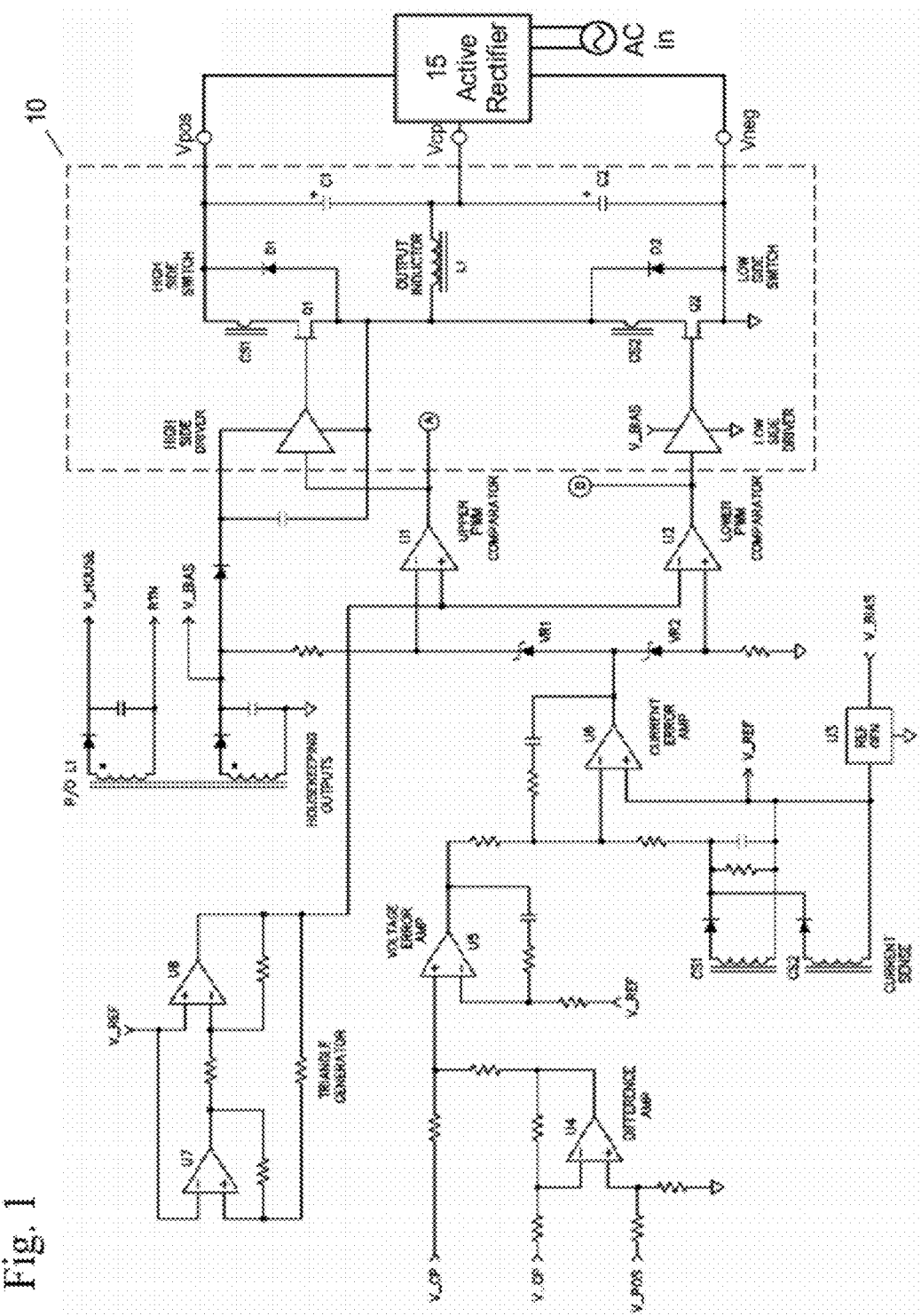
FIG. 1 shows a circuit diagram of a system according to the teachings of the present invention.

A basic circuit diagram according to the teachings of the invention is shown in FIG. 1. It will be understood by one skilled in the art that the circuit diagram in the figure is intended to illustrate the novel features of the invention, and conventional features have been omitted for clarity.

Referring to that diagram, Capacitors C1 and C2 form the series connection output of a three level active rectifier 15, fed by an AC source. These outputs are a first output Vpos, a centerpoint output Vcp, and a second output Vneg. The Vneg output may also be the ground reference. The active rectifier 15 itself does not form part of the invention, and can be of a design known to one skilled in the art.

The circuit of FIG. 1 continually adjusts the centerpoint voltage Vcp so it is centered between Vpos and Vneg.

If the voltage on capacitor C1 is higher than the voltage on capacitor C2, the control circuit, which is described below, causes a pulse width modulated output, A, from upper PWM comparator U1 to pulse width modulate the signal input of the high side switch, Q1, which causes a current flow between the first terminal and the second terminal of Q1, from capacitor C1 into inductor L1. A driver may be provided, as shown, to provide the proper levels to drive a switching input of first switch Q1 from output A. Charge is thus removed from C1 when Q1 is on, lowering the voltage across C1. When Q1 shuts off, the current built up in inductor L1 charges capacitor C2 through diode D2, depositing a charge into capacitor C2, raising the voltage on C2.

If the voltage on capacitor C2 is higher than the voltage on capacitor C1, the control circuit, which is described below, causes a pulse width modulated output B, from the lower pulse-width modulated (PWM) comparator U2 to pulse width modulate the switching input of the low side switch, Q2, which causes a current flow between the first terminal and the second terminal of Q2, from capacitor C2 into inductor L1. As above, a driver may be provided, as shown, to provide the proper levels to drive second switch Q2 from output B. Charge is thus removed from C2 when Q2 is on, lowering the voltage across C2. When Q2 shuts off, the current built up in inductor L1 charges capacitor C1 through diode D1, depositing a charge into capacitor C1, raising the voltage on C1.

Current sense transformer CS1 measures the current flowing through Q1 and current sense transformer CS2 measures the current flowing through Q2. These are used for control purposes, as will be described below.

The voltage across L1 is equal to the voltage on C1 when Q1 is on, and equal to the voltage on C2 when Q2 is on. As shown at "Housekeeping Outputs" in FIG. 1, secondary windings of L1 can be rectified in order to generate regulated DC voltages which can be used for housekeeping purposes, and to operate these control circuits. The output Vbias is referenced to Vneg and is used to operate these circuits. The output Vhouse and RTN is shown as a general purpose housekeeping output, which can be referenced to any voltage, and can be used to operate active rectifier circuits. It will be recognized that additional housekeeping outputs can also be provided using additional windings on L1.

A reference generator circuit U3 is used to generate a voltage Vref from Vbias. Vref is approximately half of Vbias. This voltage is used for some of the control functions.

U4 is a difference amp which translates the voltage across C1 to a ground referenced voltage so that it can be compared to the voltage across C2, which is already ground referenced.

U5 is the voltage error amp which compares the translated C1 voltage from U4 to the voltage Vcp from C2. The output of U5 adjusts until it allows just the right amount of current to flow in CS1 or CS2 so that the voltage on C1 equals the voltage on C2.

U6 is the current error amp. Its output adjusts so as to maintain a balance between the sensed current CS1 or CS2, and output of the voltage error amp U5.

Output of the current error amp U6 drives two voltage regulator diodes VR1 and VR2. These regulator diodes present a threshold to one leg of the upper PWM comparator, U1, and one leg of the lower PWM comparator, U2.

The other comparator leg of U1 and U2 is fed by a triangle waveform centered about Vref generated by U7 and U8.

Figure 2A:
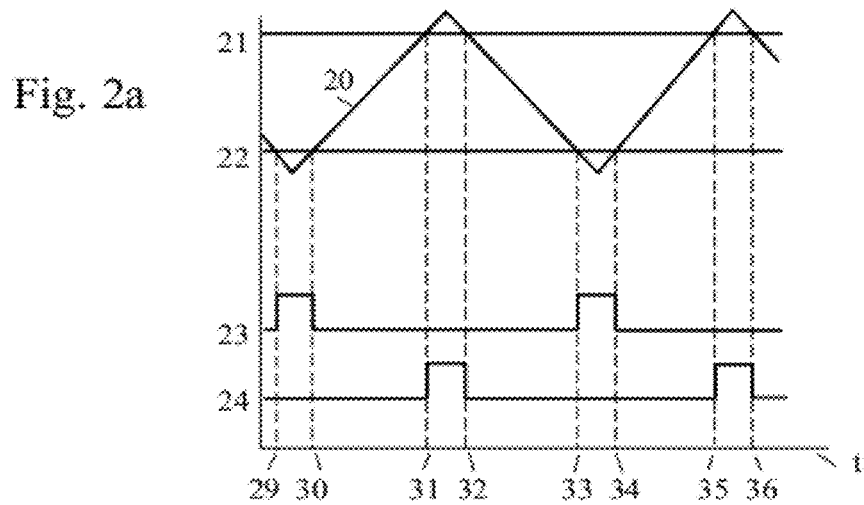
FIGS. 2a-2c show graphs of the triangle wave, comparator thresholds and drive voltages over time for different relationships of the upper capacitor voltage vs. the lower capacitor voltage.
Figure 2B:
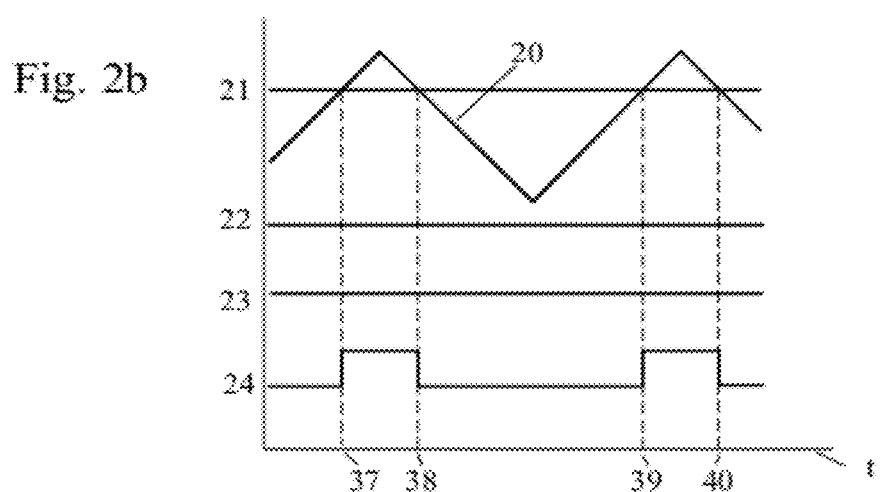
Figure 2C:
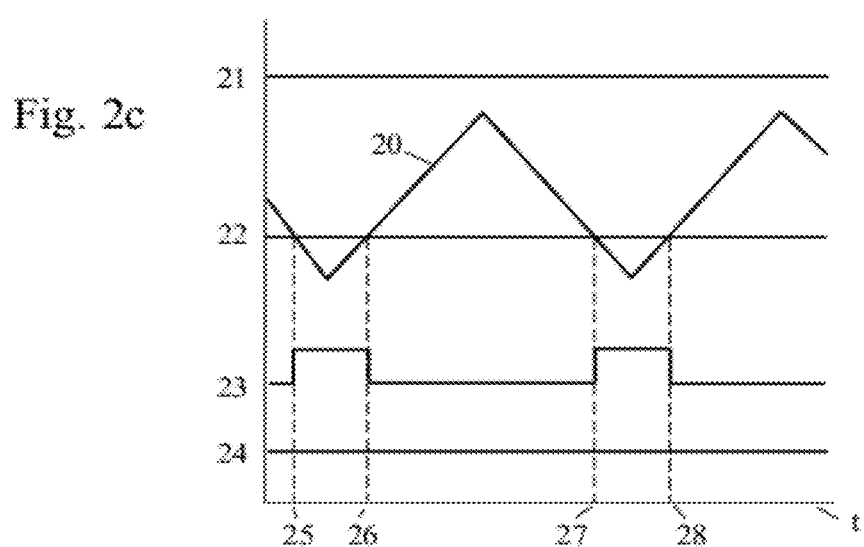

The following discussion is in reference to the voltage graphs in FIGS. 2a-2c, in which the triangle wave is graphed as line 20, the upper comparator U1 threshold voltage is shown as line 21, the lower comparator U2 threshold voltage is shown as line 22, the low side drive B is shown at 23 and the high side drive A is shown at 24. Reference numbers 25 through 40 refer to specific points in time along time axis t.

FIG. 2a shows the graph for the situation where C1 voltage is exactly equal to C2 voltage. In this case, upper and lower peaks of the triangle waveform 20 are slightly higher than the upper 21 and lower 22 thresholds. Thus, the triangle wave 20 reaches slightly above the upper comparator threshold 21 at times 31 to 32 and 35 to 36, and slightly below the lower comparator threshold 22 at times 29 to 30 and 33 to 34, generating a narrow high side drive 24 pulse at times 31 to 32 and 35 to 36 and a narrow low side drive 23 pulse of equal pulse width at times 29 to 30 and 33 to 34. This alternately pulses Q1, and then Q2, and does not change the voltage on C1 or C2.

FIG. 2b shows the graph for the situation where C1 voltage is greater than C2 voltage. In this case, the current error amp U6 output drops, and the relationship between upper threshold 21, lower threshold 22 and triangle wave 20 is as shown in FIG. 2b. The peaks of the triangle wave 20 extend well above the upper comparator threshold 21 from time 37 to 38 and 39 to 40, but the lower peaks do not drop below the lower comparator threshold 22 at any point. This generates a wide high side drive 24 pulse from 37 to 38 and 39 to 40, but no low side drive 23 pulse. In turn, this pulses Q1 and not Q2, decreasing the voltage on C1 and increasing the voltage on C2, returning Vcp to the centerpoint.

FIG. 2c shows the graph for the situation where C2 voltage is greater than C1 voltage. In this case, the current error amp U6 output rises, and the relationship between upper threshold 21, lower threshold 22 and triangle wave 20 is as shown in FIG. 2c. The lower peaks of triangle wave 20 extend well below the lower comparator threshold 22 from time 25 to 26 and 27 to 28, but the upper peaks do not reach above the upper comparator threshold 21. This generates a wide low side drive 23 pulse from 25 to 26 and 27 to 28, but no high side drive 24 pulse. In turn, this pulses Q2, and not Q1, decreasing the voltage on C2 and increasing the voltage on C1, to once again return Vcp to the centerpoint.

Alternate Use

The supply described above can also be used as a standalone DC to DC converter which will transfer charge between two capacitive sources, not necessarily in series, so as to maintain any voltage ratio between the two capacitors. Power will be transferred dynamically from one source to the other, maintaining proper voltage balance.

The control circuit of FIG. 1 can be used as a standalone DC/DC converter, so as to maintain a fixed relationship between Vpos and Vcp, or a fixed output voltage on Vpos or Vcp.

Figure 3:
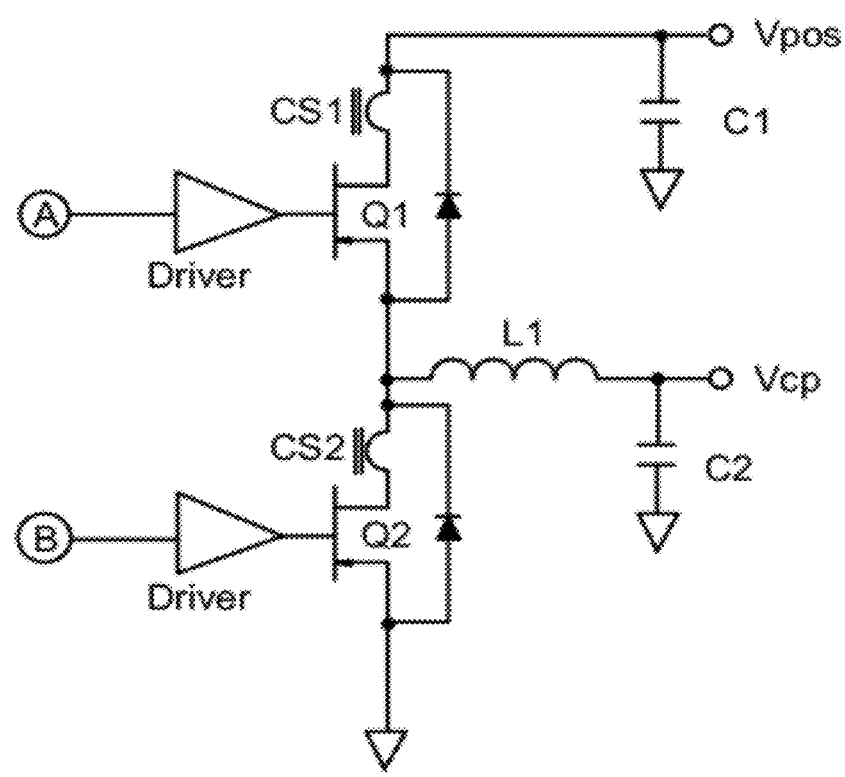
FIG. 3 shows a circuit diagram of an alternative use as a standalone DC/DC converter in box 10 of FIG. 1, for use when Vpos is higher than Vcp.

FIG. 3 shows an alternative use output circuit, replacing the circuit in box 10 of FIG. 1, which is useful for Vpos greater than Vcp. In this embodiment, the capacitor on Vpos is coupled between Vpos and ground, rather than between Vpos and Vcp. Power flows from Vpos to Vcp when A is pulsed, and power flows from Vcp to Vpos when B is pulsed.

Figure 4:
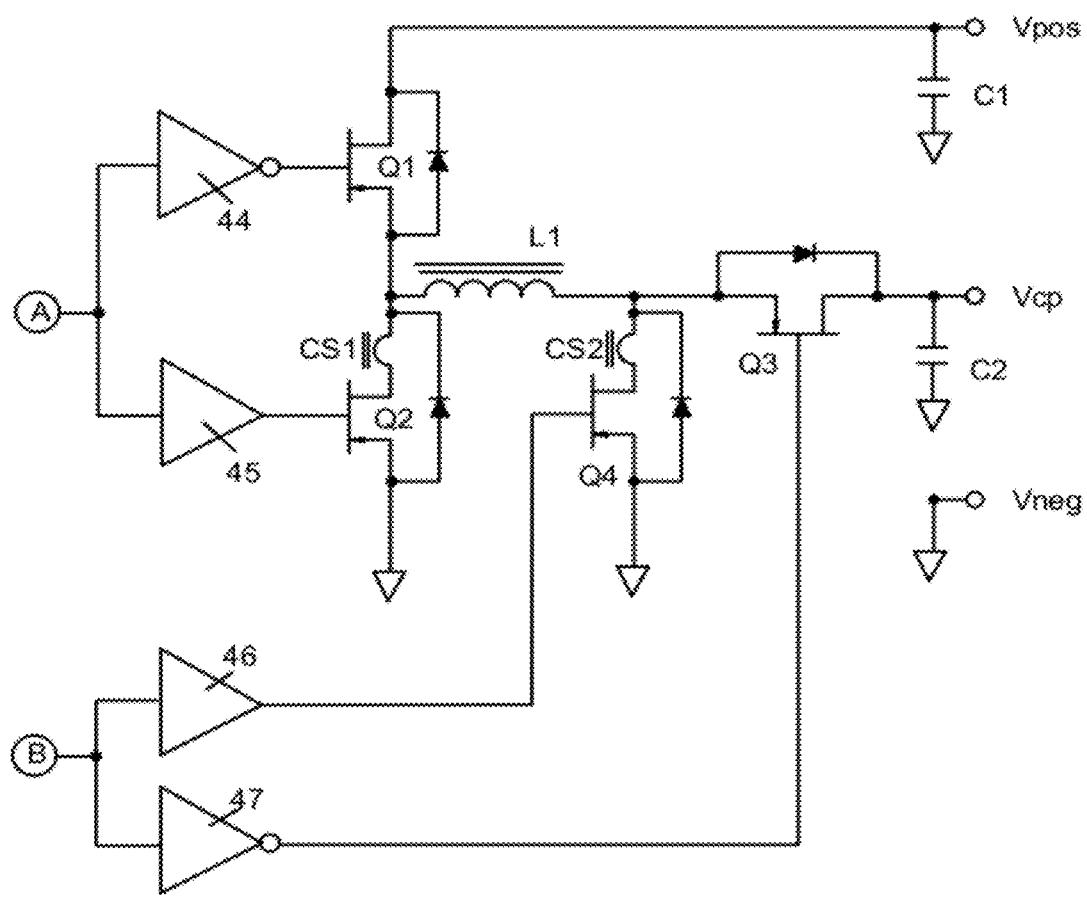
FIG. 4 shows a circuit diagram of an alternative use as a standalone DC/DC converter in box 10 of FIG. 1, for use when Vpos is higher or lower than Vcp.

If Vpos needs to be higher or lower than Vcp, then a third switch Q3 and fourth switch Q4 can be added, resulting in the alternative use output circuit as shown in FIG. 4. As with FIG. 3, this circuit would replace the output circuit of FIG. 1, box 10.

The operation of this embodiment of the output circuit of FIG. 4, assuming Vpos is to be equal to Vcp, is as follows:

Signal A is connected through driver 45 to the switching input of second switch Q2, which turns on Q2 when A is pulsed, allowing current flow between the first terminal and the second terminal of Q2. Signal A is also connected through an inverted driver 44 to the switching input of first switch Q1, which turns off Q1 when A is pulsed, blocking current flow between the first terminal and the second terminal of Q1.

Signal B is connected through driver 46 to the switching input of fourth switch Q4, which turns on Q4 when B is pulsed, allowing current flow between the first terminal and the second terminal of Q4. Signal B is also connected through an inverted driver 47 to the switching input of third switch Q3 which turns off Q3 when A is pulsed, blocking current flow between the first terminal and the second terminal of Q3.

The following discussion is in reference to the voltage graphs in FIGS. 2a-2c, in which the triangle wave is graphed as line 20, the upper comparator U1 threshold voltage is shown as line 21, the lower comparator U2 threshold voltage is shown as line 22, the drive B, is shown at 23, and drive A is shown at 24. Reference numbers 25 through 40 refer to specific points in time along time axis t.

FIG. 2a shows the graph for the situation where C1 voltage is exactly equal to C2 voltage. In this case, upper and lower peaks of the triangle waveform 20 are slightly higher than the upper 21 and lower 22 thresholds. Thus, the triangle wave 20 reaches slightly above the upper comparator threshold 21 at times 31 to 32 and 35 to 36, and slightly below the lower comparator threshold 22 at times 29 to 30 and 33 to 34, generating a narrow A drive 24 pulse at times 31 to 32 and 35 to 36 and a narrow B drive 23 pulse of equal pulse width at times 29 to 30 and 33 to 34. This alternately pulses Q2 (and its inverse Q1), and then Q4 (and its inverse Q3), and does not change the voltage on C1 or C2.

FIG. 2b shows the graph for the situation where C1 voltage is greater than C2 voltage. In this case, the current error amp U6 output drops, and the relationship between upper threshold 21, lower threshold 22 and triangle wave 20 is as shown in FIG. 2b. The peaks of the triangle wave 20 extend well above the upper comparator threshold 21 from time 37 to 38 and 39 to 40, but the lower peaks do not drop below the lower comparator threshold 22 at any point. This generates a wide A drive 24 pulse from 37 to 38 and 39 to 40, but no B drive 23 pulse. In turn, this pulses Q2 (and its inverse Q1) and does not pulse Q4 (and its inverse Q3), decreasing the voltage on C1 and increasing the voltage on C2, returning Vcp to be equal to Vpos. Note that switch Q3 is fully on, acting to connect inductor L1 to C2, and its inverse switch Q4 is off.

FIG. 2c shows the graph for the situation where C2 voltage is greater than C1 voltage. In this case, the current error amp U6 output rises, and the relationship between upper threshold 21, lower threshold 22 and triangle wave 20 is as shown in FIG. 2c. The lower peaks of triangle wave 20 extend well below the lower comparator threshold 22 from time 25 to 26 and 27 to 28, but the upper peaks do not reach above the upper comparator threshold 21. This generates a wide B drive 23 pulse from 25 to 26 and 27 to 28, but no A drive 24 pulse. In turn, this pulses Q4 (and its inverse Q3), and does not pulse Q2 (and its inverse Q1), decreasing the voltage on C2 and increasing the voltage on C1, to once again return Vcp to equal Vpos. Note that switch Q1 is fully on, acting to connect inductor L1 to C1, and its inverse switch Q2 is off.

It is known to those skilled in the art that Vpos and Vcp can be set to any ratio other than 1 by the choice of resistors around difference amp U4 and voltage error amp U5.

Vcp can also be set as a fixed voltage output, while Vpos can be set as an input that can be higher or lower than Vcp. Likewise, Vpos can be set as a fixed voltage output while Vcp is an input that can be higher or lower than Vpos.

The capacitor voltage balance can be dynamically altered by a control voltage which can be derived from a logic device such as a microcontroller. This can be done by replacing the Vref block U3 of FIG. 1 with a microcontroller block that can dynamically alter the voltage Vref It will be understood by one skilled in the art that analog functional blocks can be replaced by digital functionally equivalent blocks or incorporated into an integrated circuit. Circuits can also be used for DC/DC power conversion where power flow can be bidirectional. Either side can provide power and either side can be the load.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An active centerpoint power bus balancing system having at least a Vpos voltage output, a Vneg voltage output, and a Vcp voltage output, comprising:
    a first capacitor having a positive end coupled to the Vpos voltage output and a negative end;
    a second capacitor having a positive end coupled to the Vcp voltage output and a negative end coupled to the Vneg voltage output;
    a high side switch having a switching input, a first terminal coupled to the Vcp voltage output through an output inductor, and a second terminal coupled to the Vpos voltage output through a high side current sensor;
    a low side switch having a switching input, a first terminal coupled to the voltage input of the high side switch through a low side current sensor, and a second terminal coupled to the Vneg voltage output;
    a voltage error amp for comparing a voltage across the first capacitor to a voltage across the second capacitor, having a first input coupled to the Vpos voltage output and the Vcp voltage output, an input inverse to the first input coupled to a reference voltage, and an output;
    a current error amp for maintaining a balance between the output of the high side current sensor and the low side current sensor and the output of the voltage error amp, having a first input coupled to the high side current sensor and the low side current sensor and the output of the voltage error amp, an input inverse to the first input coupled to the reference voltage, and an output;
    an upper pulse-width modulated comparator having a first input coupled to the output of the current error amp, a second input inverted from the first input, and a pulse-width modulated output coupled to the switching input of the high side switch;
    a lower pulse-width modulated comparator having a first input coupled to the output of the current error amp, a second input inverted from the first input, and a pulse-width modulated output coupled to the switching input of the low side switch; and
    a triangle wave generator having an output coupled to the second input of the upper pulse-width modulated comparator and to the second input of the lower pulse-width modulated comparator;
    such that if a voltage on the first capacitor is higher than a voltage on the second capacitor, the pulse-width modulated output of the upper pulse-width modulated comparator pulse width modulates the switching input of the high side switch, which causes a current flow from the first capacitor into the output inductor, removing charge from the first capacitor when the high side switch is on, and when the high side switch shuts off, the current built up in the output inductor charges the second capacitor; and
    such that if the voltage on the second capacitor is higher than the voltage on the first capacitor the pulse-width modulated output of the lower pulse-width modulated comparator pulse width modulates the switching input of the low side switch, which causes a current flow from the second capacitor into the output inductor, removing charge from the second capacitor when the low side switch is on, and when the low side switch shuts off, the current built up in the output inductor charges the first capacitor.

2. The system of claim 1, in which the upper pulse-width modulated comparator is coupled to the switching input of the high side switch by a driver.

3. The system of claim 1, in which the lower pulse-width modulated comparator is coupled to the switching input of the low side switch by a driver.

4. The system of claim 1, further comprising a diode coupling the first terminal of the high side switch and the second terminal of the high side switch.

5. The system of claim 1, further comprising a diode coupling the first terminal of the low side switch and the second terminal of the low side switch.

6. The system of claim 1, in which the negative end of the first capacitor is coupled to the Vcp voltage output.

7. The system of claim 1, in which the negative end of the first capacitor is coupled to the Vneg voltage output.

8. A DC/DC converter having at least a Vpos voltage output, a Vneg voltage output, and a Vcp voltage output, comprising:
    a first capacitor having a positive end coupled to the Vpos voltage output and a negative end;
    a second capacitor having a positive end coupled to the Vcp voltage output and a negative end coupled to the Vneg voltage output;

a first switch having a switching input, a first terminal coupled to a first terminal of an output inductor, and a second terminal coupled to the Vpos voltage output;

a second switch having a switching input, a first terminal coupled to the first terminal of the output inductor through a first current sensor, and a second terminal coupled to the Vneg voltage output;

a third switch having a switching input, a first terminal coupled to a second terminal of the output inductor, and a second terminal coupled to the Vcp voltage output;

a fourth switch having a switching input, a first terminal coupled to the Vneg voltage output, and a second terminal coupled to the first terminal of the third switch and the second terminal of the output inductor through a second current sensor;

a voltage error amp for comparing a voltage across the first capacitor to a voltage across the second capacitor, having a first input coupled to the Vpos voltage output and the Vcp voltage output, an input inverse to the first input coupled to a reference voltage, and an output;

a current error amp for maintaining a balance between the output of the first current sensor and the second current sensor and the output of the voltage error amp, having a first input coupled to the high side current sensor and the low side current sensor and the output of the voltage error amp, an input inverse to the first input coupled to the reference voltage, and an output;

an upper pulse-width modulated comparator having a first input coupled to the output of the current error amp, a second input inverted from the first input, and a pulse-width modulated output coupled to the switching input of the second switch and coupled through an inverting driver to the switching input of the first switch;

a lower pulse-width modulated comparator having a first input coupled to the output of the current error amp, a second input inverted from the first input, and a pulse-width modulated output coupled to the switching input of the fourth switch and coupled through an inverting driver to the switching input of the third switch;

a triangle wave generator having an output coupled to the second input of the upper pulse-width modulated comparator and to the second input of the lower pulse-width modulated comparator;

such that if a voltage on the first capacitor is higher than a voltage on the second capacitor, the pulse-width modulated output of the upper pulse-width modulated comparator pulse width modulates the switching input of the first switch through the inverting driver and modulates the switching input of the second switch, the third switch is fully on and the fourth switch is off, which causes a current flow from the first capacitor into the output inductor, and then removing current from the output inductor and charging the second capacitor; and such that if the voltage on the second capacitor is higher than the voltage on the first capacitor the pulse-width modulated output of the lower pulse-width modulated comparator pulse width modulates the switching input of the third switch through the inverting driver and also pulse width modulates the switching input of the fourth switch, the first switch is fully on and the second switch is off, which causes a current flow from the second capacitor into the output inductor, and charging the first capacitor.

9. The converter of claim 8, further comprising a diode coupling the first terminal of the first switch and the second terminal of the first switch.

10. The converter of claim 8, further comprising a diode coupling the first terminal of the second switch and the second terminal of the second switch.

11. The converter of claim 8, further comprising a diode coupling the first terminal of the third switch and the second terminal of the third switch.

12. The converter of claim 8, further comprising a diode coupling the first terminal of the fourth switch and the second terminal of the fourth switch.

13. The converter of claim 8, in which the negative end of the first capacitor is coupled to the Vcp voltage output.

14. The converter of claim 8, in which the negative end of the first capacitor is coupled to the Vneg voltage output.

\* \* \* \* \*